3,445,399
METHOD FOR COALESCING A DISPERSED AQUEOUS CAUSTIC PHASE FROM A STREAM OF HYDROCARBONS
Kent Jander, Dyer, Ind., assignor to Standard Oil Company, Chicago, Ill., a corporation of Indiana
No Drawing. Filed Dec. 16, 1965, Ser. No. 514,369
Int. Cl. B01d 17/02; C10g 33/04
U.S. Cl. 252—324                                4 Claims

ABSTRACT OF THE DISCLOSURE

An aqueous caustic dispersed in a stream of hydrocarbons is coalesced by passing the stream over silica sand having grains of an angularity between from 0.1 to 0.6 Krumbein roundness factor and an ASTM standard sieve size range between the larger and the smaller-sized particles of less than about 20 holes per lineal inch, said sieve size range also being within the broad range of about ASTM No. 10 sieve size to about ASTM No. 100 sieve size. From 50 to 100 parts of water per 1,000,000 parts of hydrocarbons are introduced into the stream before it passes over the sand. This water washes the sand free of any caustic entrained by the sand.

---

This invention relates to an improved method of coalescing dispersed aqueous phases from hydrocarbon streams and more particularly to the use of silica sand of a particular angularity and size as the coalescing medium.

Water-washing followed by a settling period was used to remove entrained treating solutions from fuels prior to the introduction of rock salt coalescers. Their use has resulted in a considerable reduction in investment costs and in fewer problems with hazy fuels. However, carry-over of treating solutions and brine from the coalescers has been a recurrent problem. The introduction of brine and caustic solutions into tanks decreases the effectiveness of anti-rusts and other additives, which are added to fuels, and furthermore many complaints of slugged filters by customers of the petroleum industry can be traced to treating solution carry-over.

Materials, other than NaCl, can be used or have been proposed for use as coalescing media. Uses of blast furnace slag coated with water glass, sand towers, glass wool, molecular sieves, air coalescing, fluidized droplet beds, porous polyethylene, and excelsior have either been used or proposed for use; however, their effectiveness has not been demonstrated. Sand towers, for instance, are not new to the petroleum industry but they are not commonly used because of pressure drops and repeated low efficiency.

Also, one of the problems encountered using NaCl coalescers is that brine, which greatly accelerates the corrosion of steel, can be introduced into storage tanks. Also, certain fuels seem to be inherently more corrosive than others; for example, virgin gas oil. Therefore, an ideal coalescing medium would be one which would give a non-corrosive aqueous solution or no aqueous phase, and which would reduce the inherent corrosivity of the fuel being coalesced.

The problem, for example, of removing caustic hazes is particularly accentuated by attempting the removal by the use of a medium other than salt. It is desirable, therefore, to provide a coalescing medium which would be equal to or surpass the effectiveness of salt and yet overcome its deleterious effects. The medium to be effective should be relatively insoluble in both hydrocarbon and treating solution to avoid the corrosion problems which are encountered using water soluble materials. Secondly, the coalescing medium should also be inert with respect to water and oil to prevent the formation of reaction products, which could cause excessive pressure drop in the coalescing bed, or could carry out and cause difficulty elsewhere. Thirdly, the medium should be comparable in cost to NaCl.

It has been discovered that silica sand of particular angularity and size makes a most effective coalescing medium in removing dispersed aqueous phases from hydrocarbon streams and in particular a most effective medium in removing caustic hazes from these streams.

Accordingly, an important object of this invention is to provide a coalescing medium that will effectively and efficiently remove dispersed aqueous phases, including, but not limited to, caustic hazes from hydrocarbon streams, thereby producing a clear and bright effluent.

Another object of this invention is to provide a coalescing medium which will allow the attainment of greater linear velocities through the medium, thus making it possible to reduce the size of coalescing vessels.

A further object of this invention is to provide a coalescing medium which is not corrosive to tanks and equipment and one whose presence will be eliminated from finished products.

A still further object of this invention is to provide a means to overcome the deleterious effects caused by pressure drop across the coalescing medium.

Other objects of the invention will become apparent to one skilled in the art upon consideration of the accompanying disclosure.

Briefly stated, this invention provides a method for coalescing a dispersed aqueous from a hydrocarbon stream by passing the stream downward through a contacting mass of silica sand having an approximate angularity range of between about 0.1 to 0.6 Krumbein and an approximate sieve size range of about ASTM Standard No. 10 sieve to about No. 40 sieve. This invention also provides for a method in overcoming pressure drop across the contacting mass by introducing a liquid, immiscible in the hydrocarbons and miscible in the dispersed phase, into the hydrocarbon stream prior to its passing downward through the contacting mass thereby allowing the coalesced phase to freely drain from the contacting mass.

Silica sand of the angularity and particle size mentioned above has been found to be an excellent material for coalescing dispersed phases, particularly caustic hazes. The angularity of the grains provides more exposed contact surfaces for wetting by the phase. Also the angularity tends to cause the stream to pass through the medium in an irregular manner which allows more of the phase to contact the surface of the grains. As the particle size decreases, shallower beds can be used for the same coalescence. It is conceivable that very fine angular silica sands, down to 100 mesh, could be used to fabricate a depth type coalescing element (with walls 2–3 inches thick) that would be effective in removing caustic hazes in conventional mechanical coalescers of the Warner-Lewis type. To date every attempt to manufacture a cartridge that will satisfactorily coalesce caustic hazes, yet withstand caustic attack over long periods of time, has failed. The optimum angularity range is about a Krumbein factor of 0.4 to 0.6 and the optimum sieve size 20–40 (ASTM Standard Sizes).

As explained above, sand towers have been used for coalescing dispersed phases from hydrocarbon streams and are not new to the petroleum industry. However, they are not widely used because of pressure drop problems and low efficiency. In order to overcome pressure drop large coarse gravel or round-grain sand are used. When these materials are used, however, the beds must be several feet in thickness in order to provide adequate coalescing.

The pressure drop across the bed is caused by the fact that the viscosity of the caustic phase may be so high that it cannot drain fast enough from the bed. As a result the space between the sand particles gradually fills with caustic, the pressure differential through the bed increases and coalescing efficiency declines.

In accordance with this invention it has been discovered that this pressure drop may be overcome by continuously proportioning a fluid, such as water to the oil entering the coalescer to dilute the caustic and lower the viscosity, thereby permitting the caustic to drain from the bed. To produce a coalescer effluent that is clear and bright, the water addition rate is critical. The optimum fluid addition rate is in the range of about 50-100 parts per million parts of hydrocarbons. If a fluid other than water is utilized, it is, of course, necessary that the fluid be immiscible in the hydrocarbons and miscible in the dispersed phase.

The method of this invention may be employed in any coalescing tower or vessel. When employing the method in accordance with the invention, it will be possible to greatly reduce the size of the tower or vessel used since, for example, a two-foot thick bed of silica sand in the optimum ranges of grain angularity and size will produce an effluent clearer and brighter than will a sixteen-foot bed of quarter inch rock salt. An additional factor which permits the reduction in size of the tower or vessel is that in the use of silica sand linear velocities three times greater than salt can be achieved.

Silica sand of the type utilized in the method of the invention is commercially available.

The following executional examples illustrate the invention:

EXAMPLE 1

A caustic haze was coalesced from a hydrocarbon stream under downflow conditions in a coalescing vessel. The grains of the silica sand used as the contact medium were in the optimum range of angularity and sieve size with 36% voids. The depth of the bed was 11 inches. The effluent produced was bright and clear.

| Run No. | Flow conditions | | | | Bed Press. drop, Δ p.s.i. | Caustic in oil [1] (gms. equiv. NaOH/liter) | | Caustic removed | | |
|---|---|---|---|---|---|---|---|---|---|---|
| | Flow rate, cc./min. | Space vel.[2] | Linear[1] vel., cc./min. | Contact[1] time, min. | | Feed | Effl. | Vol. caustic cc. | Time period, hrs. | Cc. caustic per 1,000 liters oil |
| 1 | 970 | 25.4 | 33.1 | .8 | 1.4 | .2223 | .0205 | 248 | 6.75 | .63 |
| 2 | 2,800 | 73.2 | 95.5 | .3 | 3.1 | .1175 | .0160 | 345 | 4.0 | .51 |
| 3 | 3,000 | 78.4 | 102.3 | .3 | 3.5 | .1595 | .0201 | 415 | 6.0 | .38 |
| 4 | 2,850 | 74.5 | 97.3 | .3 | 3.4 | .1822 | .0184 | 360 | 4.0 | .53 |

[1] Brom Phenol Blue used for titration indicator. Values reported as equivalent gms. NaOH per liter represent total basicity of oil sample to a pH of 4.
[2] Space velocity defined as follows: vol. of oil flowing per hour divided by volume of bed.

EXAMPLE 2

The following results were obtained under the same conditions as Example 1 with the exception that the bed depth was 17 inches and water was introduced into the hydrocarbon stream in the optimum range of 50-100 p.p.m.

| Run No. | Flow conditions | | | | | | Bed Press. drop, p.s.i. | Caustic in oil,[2] mg. NaOH/liter | | Haze points | | | | KF water | |
|---|---|---|---|---|---|---|---|---|---|---|---|---|---|---|---|
| | Oil rate, cc./min. | Water rate, cc./min. | Percent H₂O on oil flow | Space[1] vel. | Linear[1] vel., cm./min. | Contact[1] time, min. | | Feed | Effl. | Feed | | Effl. | | Feed, p.p.m. | Effl., p.p.m. |
| | | | | | | | | | | Init. | Def. | Init. | Def. | | |
| 5 | 1,080 | 120 | 11.1 | 18.4 | 36.9 | 1.2 | 4 | 8.6 | .1 | | | 97 | 94 | | 242 |
| 6 | 1,530 | 90 | 5.9 | 26.2 | 52.2 | .8 | 5 | 13.6 | .2 | | | 99 | 97 | 210 | 252 |
| 7 | 1,400 | 80 | 5.7 | 23.9 | 47.8 | .9 | 5 | 10.0 | .2 | | | 95 | 93 | | 282 |
| 8 | 990 | 110 | 11.1 | 16.9 | 33.8 | 1.3 | 5 | 6.9 | .2 | 105 | 98 | 106 | 103 | 294 | 315 |

[1] Based only on oil flow rate.
[2] Brom Thymol Blue used for titration indicator. Values obtained at a pH of 7 largely represent quantity of NaOH present in sample.

EXAMPLE 3

This example represents a comparison of results between the method of this invention and a conventional salt tower. The angularity of the silica sand grains was in the optimum range.

DESIGN CONDITIONS: SAND COALESCER VS. SALT TOWER FOR REMOVING HAZE FROM A HYDROCARBON STREAM

| | Sand coalescer | Salt tower | Sand coalescing w/water wash |
|---|---|---|---|
| Oil | 1,000 | 1,000 | 1,000. |
| Flow rate, b./d | 12,000 | 12,000 | 12,000. |
| Flow rate, bbls./hr | 500 | 500 | 500. |
| Flow direction | Down | Up | Down. |
| Vessel size: | | | |
| Dia., ft | 8 | 10 | 8. |
| Height, ft | 10 | 30 | 10. |
| Coalescing bed: | | | |
| Height, ft | 4 | 16 | 4. |
| Material | Silica sand | Rock salt | Silica sand. |
| Particle size, sieve size | 20-40 | 4 | 20-40. |
| Void space, percent | 36 | 44 | 36. |
| Cross-sectional area of vessel, sq. ft | 50.2 | 78.4 | 50.2. |
| Cross-sectional free area of bed, sq. ft | 18.1 | 34.5 | 18.1. |
| Volume of bed (apparent), cu. ft | 100 | 1,255 | 100. |
| Space velocity, vol. oil/hr./vol. of bed | 28.0 | 2.2 | 29.4.[1] |
| Linear velocity through bed, ft./min | 2.58 | 1.35 | 2.71.[2] |
| Contact time in bed, min | .78 | 11.85 | .74. |
| Pressure drop across bed, p.s.i | 5-6 | 1-2 | 6-7. |
| Temperature of oil in vessel, °F | 100-130 | 100-130 | 95-125. |
| Caustic in oil: | | | |
| Entering vessel, mg. NaOH per liter | 150 | 150 | 10. |
| Leaving vessel, mg. NaOH per liter | 10 | 10 | 0.2. |
| Volume of separated phase removed, b./d | 6 | 6 | 600. |
| Properties of hydrocarbon stream: | | | |
| Gravity, °API | 28-29 | 28-29 | 28-29. |
| Sp. grav. at 60° F | .88 | .88 | .88. |
| Viscosity, cs. at 60° F | 5.1 | 5.1 | 5.1. |
| Viscosity, cs. at 100° F | 2.9 | 2.9 | 2.9. |
| Properties of separated phase, sp. gravity at 60° F | 1.2 | | 1.0. |
| Water addition, percent H₂O in feed | | | 5. |

[1] Space velocity, vol. of oil + H₂O/hr./vol. of bed.
[2] Based on vol. of oil + water.

Having thus described the invention, what is claimed is:

1. A method for coalescing a dispersed aqueous caustic phase from a stream of hydrocarbons, comprising the steps of:
   (1) providing a shallow sand bed consisting essentially of silica sand grains having an angularity between about 0.1 and 0.6 Krumbein roundness factor and an ASTM standard sieve size range between the larger and the smaller-sized particles of less than about 20 holes per lineal inch, said sieve size range also being within the broad range of about ASTM No. 10 sieve size to about ASTM No. 100 sieve size;
   (2) passing said stream through said bed to coalesce the aqueous caustic phase, whereby a pressure drop develops across said bed; and
   (3) substantially reducing said pressure drop by introducing into said stream before passing said stream through said bed water in the ratio of about 50 to 100 parts of water to 1,000,000 parts of said hydrocarbons.

2. The method defined in claim 1 wherein said sand consists essentially of sand graded within ASTM Standard No. 10 and No. 20 sieve.

3. The method defined in claim 2 wherein said sand consists essentially of sand graded within ASTM Standard No. 20 and No. 40 sieve.

4. The method defined in claim 3 wherein said sand grains have an angularity between 0.4 and 0.6 Krumbein factor.

References Cited

UNITED STATES PATENTS

| | | | |
|---|---|---|---|
| Re. 15,871 | 7/1924 | Dyer et al. | 252—324 |
| 1,596,586 | 8/1926 | De Groote | 252—324 |
| 2,133,186 | 10/1938 | Campbell | 252—324 |
| 2,454,605 | 11/1948 | Kirkbride et al. | 252—324 |
| 2,477,318 | 7/1949 | Stevenson | 252—324 |
| 2,838,116 | 6/1958 | Clark et al. | 252—8.55 X |
| 3,011,970 | 12/1961 | Goodman et al. | 208—188 |
| 3,215,619 | 11/1965 | Brooke | 208—188 |

HERBERT B. GUYNN, *Primary Examiner.*

U.S. Cl. X.R.

208—187, 188; 252—330